(12) United States Patent
Jang et al.

(10) Patent No.: US 10,352,460 B2
(45) Date of Patent: Jul. 16, 2019

(54) COOLANT CONTROL VALVE UNIT HAVING SEALING STRUCTURE

(71) Applicants: HYUNDAI MOTOR COMPANY, Seoul (KR); KIA MOTORS CORPORATION, Seoul (KR); NVH KOREA, INC., Ulsan (KR); INZICONTROLS CO., LTD., Siheung-si, Gyeonggi-do (KR); GMB Korea Corp., Changwon-si, Gyeongsangnam-do (KR)

(72) Inventors: Jae Soo Jang, Hwaseong-si (KR); Phil Gi Lee, Suwon-si (KR); Jea Woong Yi, Uiwang-si (KR); Ju Bong Lee, Hwaseong-si (KR); In Hee Lee, Seongnam-si (KR); Seo Kyu Kim, Incheon (KR); Cheol Soo Park, Suwon-si (KR)

(73) Assignees: HYUNDAI MOTOR COMPANY, Seoul (KR); Kia Motors Corporation, Seoul (KR); MVH Korea, Inc., Ulsan (KR); Inzicontrols Co., Ltd., Siheung-si, Gyeonggi-do (KR); GMB Korea Corp., Changwon-si, Gyeongsangnam-do (KR)

( * ) Notice: Subject to any disclaimer, the term of this patent is extended or adjusted under 35 U.S.C. 154(b) by 0 days.

(21) Appl. No.: 15/583,203

(22) Filed: May 1, 2017

(65) Prior Publication Data

US 2017/0321812 A1    Nov. 9, 2017

(30) Foreign Application Priority Data

May 4, 2016   (KR) .................. 10-2016-0055660
Oct. 11, 2016 (KR) .................. 10-2016-0131442

(51) Int. Cl.
*F16K 5/06*    (2006.01)
*F16K 11/087*  (2006.01)
(Continued)

(52) U.S. Cl.
CPC .......... *F16K 5/0678* (2013.01); *F16K 5/0663* (2013.01); *F16K 5/201* (2013.01);
(Continued)

(58) Field of Classification Search
CPC .... F16K 5/0663; F16K 5/0673; F16K 5/0678; F16K 5/0689; F16K 5/20; F16K 5/202;
(Continued)

(56) References Cited

U.S. PATENT DOCUMENTS 2,841,429 A * 7/1958 McCuistion ......... F16J 15/3236
                                              251/900
2,868,498 A * 1/1959 Kaiser ................... F16K 5/0626
                                              251/172

(Continued)

FOREIGN PATENT DOCUMENTS

DE    102009014047 A1    9/2010
EP         2840242 A1    2/2015
(Continued)

OTHER PUBLICATIONS

European Office Action dated Mar. 5, 2018 issued in European Patent Application No. 17168170.3.
(Continued)

*Primary Examiner* — Reinaldo Sanchez-Medina
*Assistant Examiner* — David Colon-Morales
(74) *Attorney, Agent, or Firm* — Morgan, Lewis & Bockius LLP

(57) ABSTRACT

Disclosed is a coolant control valve unit having a sealing structure, the control valve unit including: a rotary valve provided with a valve coolant passage formed from an inner
(Continued)

surface to an outer surface of the rotary valve; a valve housing in which the rotary valve is rotatably provided; a fitting coupled to the valve housing, and having a fitting coolant passage; and a sealing unit provided between a front surface of the fitting and the outer surface of the rotary valve, wherein the sealing unit includes: a sealing ring being in contact with the outer surface of the rotary valve; and a rubber ring provided on the front surface of the fitting, and bringing the sealing ring into contact with the outer surface of the rotary valve, wherein the rubber ring has an X-shaped cross-section, with a front groove, a rear groove, an inner groove, and an outer groove.

8 Claims, 5 Drawing Sheets

(51) Int. Cl.
  *F16K 5/20*   (2006.01)
  *F01P 7/14*   (2006.01)
(52) U.S. Cl.
  CPC ............ *F16K 5/205* (2013.01); *F16K 11/087* (2013.01); *F01P 2007/146* (2013.01)
(58) Field of Classification Search
  CPC .... F16K 5/205; F16K 11/087; F16K 11/0873; F16K 11/0876; F01P 2007/146; F01P 7/14
  USPC ........ 251/363, 317, 316, 314, 172, 175, 192
  See application file for complete search history.

(56) References Cited

U.S. PATENT DOCUMENTS

| | | | | |
|---|---|---|---|---|
| 2,983,533 A * | 5/1961 | Tisch | ................ | F16J 15/32 277/649 |
| 3,052,478 A * | 9/1962 | Horvereid | ................ | F16J 15/32 277/394 |
| 3,131,906 A * | 5/1964 | King | ................ | F16K 5/0673 251/315.05 |
| 3,214,135 A * | 10/1965 | Hartmann | ................ | F16K 5/0689 137/246.22 |
| 3,357,679 A * | 12/1967 | Gulick | ................ | F16K 5/0673 251/172 |
| 3,380,708 A * | 4/1968 | Scaramucci | ................ | F16K 5/0642 251/172 |
| 3,472,270 A * | 10/1969 | Masheder | ................ | F16K 5/0631 137/315.19 |
| 3,556,474 A * | 1/1971 | Scaramucci | ................ | F16K 5/0673 251/172 |
| 3,561,727 A * | 2/1971 | Scaramucci | ................ | F16K 5/0673 251/172 |
| 3,599,931 A * | 8/1971 | Hanson | ................ | F16K 31/1221 251/144 |
| 3,700,006 A * | 10/1972 | Marcillaud | ................ | F16K 11/0873 137/625.21 |
| 4,099,705 A * | 7/1978 | Runyan | ................ | F16K 5/0642 251/171 |
| 4,111,393 A * | 9/1978 | McClurg | ................ | F16K 5/0673 251/174 |
| 4,258,900 A * | 3/1981 | Kindersley | ................ | F16K 5/0673 251/172 |
| 4,540,157 A * | 9/1985 | Kawanami | ................ | F16K 5/0673 251/315.05 |
| 4,572,515 A * | 2/1986 | Grazioli | ................ | F16K 5/0673 251/317 |
| 4,762,301 A * | 8/1988 | Wozniak | ................ | F16K 5/0642 251/171 |
| 4,795,133 A * | 1/1989 | Berchem | ................ | F16K 5/0657 251/171 |
| 5,419,532 A * | 5/1995 | Fan | ................ | F16K 5/0673 251/315.08 |
| 5,626,520 A * | 5/1997 | Mazziotti | ................ | F16C 33/7809 277/566 |
| 6,217,003 B1* | 4/2001 | Shafer | ................ | F16K 5/0673 251/171 |
| 7,484,710 B2* | 2/2009 | Koester | ................ | F16K 5/0678 251/160 |
| 9,695,734 B2* | 7/2017 | Carns | ................ | F01P 7/14 |
| 2004/0036052 A1* | 2/2004 | Nowak | ................ | F16K 5/0673 251/314 |
| 2006/0138375 A1* | 6/2006 | Baumann | ................ | F16J 15/025 251/175 |
| 2010/0200791 A1* | 8/2010 | Yung | ................ | F16K 5/0673 251/172 |
| 2010/0282190 A1* | 11/2010 | Stoermer | ................ | F16K 11/0856 123/41.08 |
| 2015/0122359 A1* | 5/2015 | Tsuchiya | ................ | F01P 7/16 137/625.47 |
| 2015/0300508 A1* | 10/2015 | He | ................ | F16K 5/0678 251/314 |
| 2016/0010536 A1 | 1/2016 | Murakami et al. | | |
| 2016/0109031 A1* | 4/2016 | Greene | ................ | F16K 5/201 251/314 |

FOREIGN PATENT DOCUMENTS

| | | |
|---|---|---|
| EP | 2910826 A2 | 8/2015 |
| EP | 3006794 A1 | 4/2016 |
| JP | 2004-137981 A | 5/2004 |
| JP | 2012-241610 A | 12/2012 |
| KR | 10-1558394 B1 | 10/2015 |
| KR | 10-1601234 B1 | 3/2016 |
| KR | 10-1628127 B1 | 6/2016 |
| KR | 10-1683530 B1 | 12/2016 |
| WO | 2008049624 A2 | 5/2008 |

OTHER PUBLICATIONS

Extended European Search Reported issued in corresponding EP Application No. 17168170.3, dated Sep. 27, 2017.

\* cited by examiner

COOLANT CONTROL VALVE UNIT HAVING SEALING STRUCTURE

CROSS REFERENCE TO RELATED APPLICATION

The present application claims priority to Korean Patent Application No. 10-2016-0055660, filed May 4, 2016 and Korean Patent Application No. 10-2016-0131442, filed Oct. 11, 2016, the entire contents of which is incorporated herein for all purposes by this reference.

BACKGROUND OF THE INVENTION

Field of the Invention

The present invention relates generally to a coolant control valve unit having a sealing structure. More particularly, the present invention relates to a coolant control valve unit having a sealing structure, wherein the valve unit is provided between a rotary valve and a valve housing, thereby efficiently improving a sealing structure for a coolant passing through a coolant passage of the rotary valve.

Description of the Related Art

In general, an engine generates torque by combustion of fuel, and the combustion energy not converted to mechanical energy is discharged as thermal energy. In particular, a coolant absorbs thermal energy while circulating throughout the engine, a heater, and a radiator to discharge the absorbed thermal energy to the outside.

When a coolant temperature of the engine is low, viscosity of oil is increased so that frictional force is increased, and fuel consumption is increased. Further, as the temperature of exhaust gas slowly rises, the catalyst activation time is extended, and quality of exhaust gas may be lowered. In addition, time for normal operation of the heater is prolonged so that vehicle occupants may feel cold.

When the coolant temperature of the engine is excessively high, knocking occurs. If ignition timing is adjusted to suppress occurrence of the knocking, engine performance may be deteriorated. Further, if a temperature of lubricating oil is excessively high, lubrication performance may be deteriorated.

Thus, one integrated coolant control valve that controls several cooling elements is used whereby a temperature of the coolant at a specific part of the engine is maintained high, and a temperature of the coolant at other parts is maintained low.

On the other hand, research is underway to more precisely control the coolant flow by improving a sealing structure from a structure in which one rotary valve is inserted into a valve housing and each stream of coolant flowing through several coolant passages is controlled in accordance with rotational position of the rotary valve.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the prior art, and an object of the present invention is to provide a coolant control valve unit having a sealing structure, the control valve unit being capable of implementing a novel sealing structure by allowing a uniform sealing pressure to be formed and a sealing structure to be more stable.

In order to accomplish the above object, the present invention provides a coolant control valve unit having a sealing structure, the control valve unit including: a rotary valve provided with a valve coolant passage formed from an inner circumferential surface to an outer circumferential surface of the rotary valve; a valve housing in which the rotary valve is rotatably provided; a fitting coupled to the valve housing at a position corresponding to the valve coolant passage, and provided with a fitting coolant passage corresponding to the valve coolant passage; and a sealing unit provided between a front surface of the fitting and the outer circumferential surface of the rotary valve, wherein the sealing unit includes: a sealing ring being in contact with the outer circumferential surface of the rotary valve to realize a slidable relationship therebetween; and a rubber ring provided on the front surface of the fitting, and bringing the sealing ring into close and elastic contact with the outer circumferential surface of the rotary valve, wherein the rubber ring has an X-shaped cross-section, with a front groove being formed along a center of a front surface of the rubber ring, a rear groove being formed along a center of a rear surface of the rubber ring, an inner groove being formed along an inner surface of the rubber ring to be directed toward a center of the fitting coolant passage, and an outer groove being formed oppositely to the inner groove.

The rubber ring may be provided with front protrusions formed between the front groove and the outer groove and between the front groove and the inner groove, respectively, and may be provided with rear protrusions formed between the rear groove and the outer groove and between the rear groove and the inner groove, respectively, wherein the front protrusions and the rear protrusions may extend in four directions by predetermined distances to form the X-shaped cross-section.

The sealing ring and the rubber ring may be formed in a ring shape corresponding to a shape of the valve coolant passage.

The outer circumferential surface of the rotary valve may be a ball-shaped curved surface, and the valve coolant passage may be formed through the ball-shaped curved surface.

The control valve unit may further include a support ring provided between a rear surface of the sealing ring and the rubber ring.

The support ring may be provided with a support ring outer protrusion formed along an outer circumference of a front surface of the support ring, and a support ring inner protrusion formed along an inner circumference of a rear surface of the support ring.

The fitting may be provided with a fitting inner protrusion circumferentially protruding from the front surface of the fitting at a position close to the center of the fitting coolant passage to correspond to the support ring inner protrusion.

The fitting may be provided with a fitting outer protrusion circumferentially formed on the front surface of the fitting at a position outside the fitting inner protrusion, with the sealing ring being placed therebetween, wherein the fitting outer protrusion may extend forward such that an inner circumferential surface of the fitting outer protrusion faces at least a part of an outer circumferential surface of the support ring outer protrusion.

The rubber ring may be further provided with an auxiliary protrusion formed in the outer groove by protruding outward.

The outer circumferential surface of the rotary valve may be a ball-shaped curved surface, and the sealing ring may have an inclined surface corresponding to the ball-shaped curved surface.

As described above, according to the present invention for achieving the above object, more uniform sealing pressure is formed through the structure of the rubber ring having an X-shape or K-shape, thereby realizing a stable sealing structure.

In addition, the coupling structure between the support ring and the fitting is improved, thereby efficiently preventing separation of the sealing ring and the rubber ring, and a gap is formed between the protrusions of the support ring and the fitting, thereby realizing a sealing structure in which the rubber ring is compressed therebetween.

DETAILED DESCRIPTION OF THE INVENTION

Figure 1:
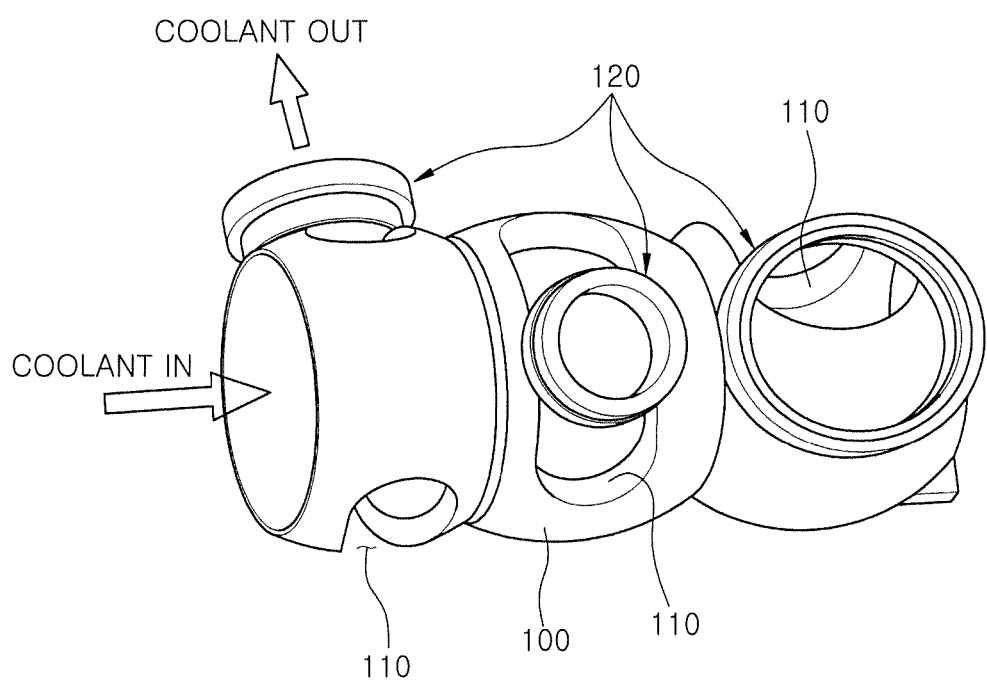
FIG. 1 is a partial perspective view showing a coolant control valve unit having a sealing structure according to the present invention.

Hereinbelow, exemplary embodiments of the present invention will be described in detail with reference to the accompanying drawings.

For convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

In the following description, it is to be noted that, when the functions of conventional elements and the detailed description of elements related with the present invention may make the gist of the present invention unclear, a detailed description of those elements will be omitted. Wherever possible, the same reference numerals will be used throughout the drawings and the description to refer to the same or like elements or parts.

Terms such as "a first ~" and "a second ~" are used only for the purpose for distinguishing a constitutive element from other constitutive elements, but constitutive elements should not be limited to a manufacturing order, and the terms described in the detailed description of the invention may not be consistent with those described in the claims.

Further, it will be understood that, although the terms "front surface", "rear surface", "inner side", "outer side," etc. may be used herein to describe various elements, these elements should not be limited by these terms.

FIG. 1 is a partial perspective view showing a coolant control valve unit having a sealing structure according to the present invention.

Referring to FIG. 1, the coolant control valve unit includes a rotary valve 100, a valve coolant passage 110, and a sealing unit 120.

The rotary valve 100 has a pipe structure, such that a coolant is supplied through an inlet provided at an end of the rotary valve 100, and then the coolant supplied to an interior of the rotary valve 100 is distributed to each coolant consumer via the valve coolant passage 110 in accordance with rotational position of the rotary valve 100.

Figure 2:
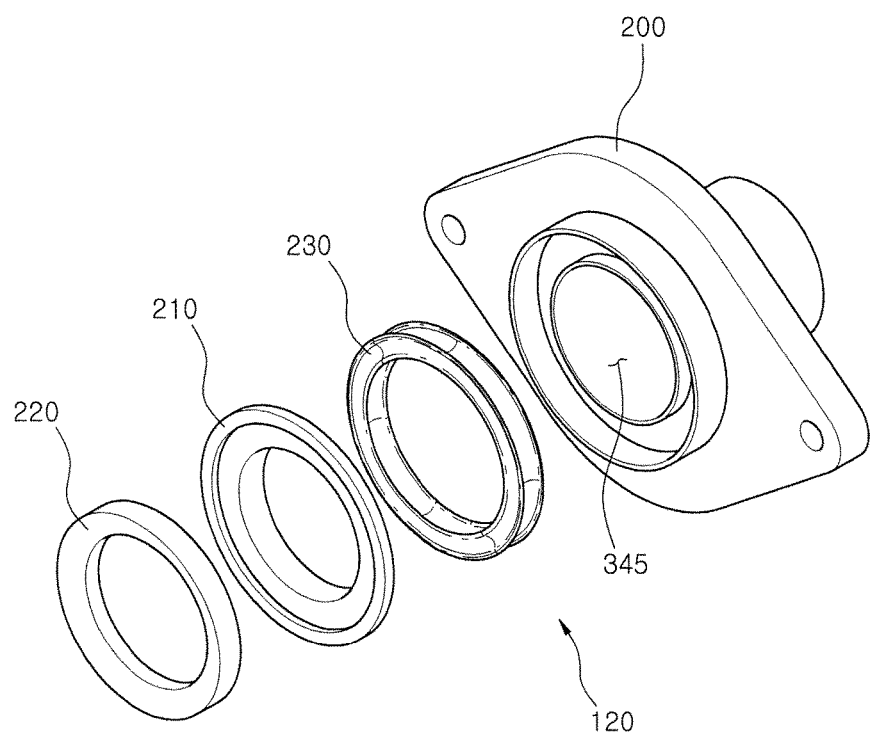
FIG. 2 is a partially exploded perspective view showing the coolant control valve unit according to an embodiment of the present invention.

The coolant passing through the valve coolant passage 110 is distributed to each coolant consumer via a fitting coolant passage 345 centrally formed through the ring-shaped sealing unit 120 and a fitting (reference numeral 200 in FIG. 2).

The sealing unit 120 is provided between an outer circumferential surface of the rotary valve 100 and an inner circumferential surface of a valve housing 500 at which the rotary valve 100 is rotatably provided, such that a sealing structure for a coolant is implemented.

FIG. 2 is a partially exploded perspective view showing the coolant control valve unit according to an embodiment of the present invention.

Referring to FIG. 2, the sealing unit 120 includes a rubber ring 230, a support ring 210, and a sealing ring 220. The sealing unit 120 is supported on an inner edge of a front surface 340 of the fitting 200, such that a sealing structure between the outer circumferential surface of the rotary valve 100 and the fitting 200 is implemented.

Figure 3:
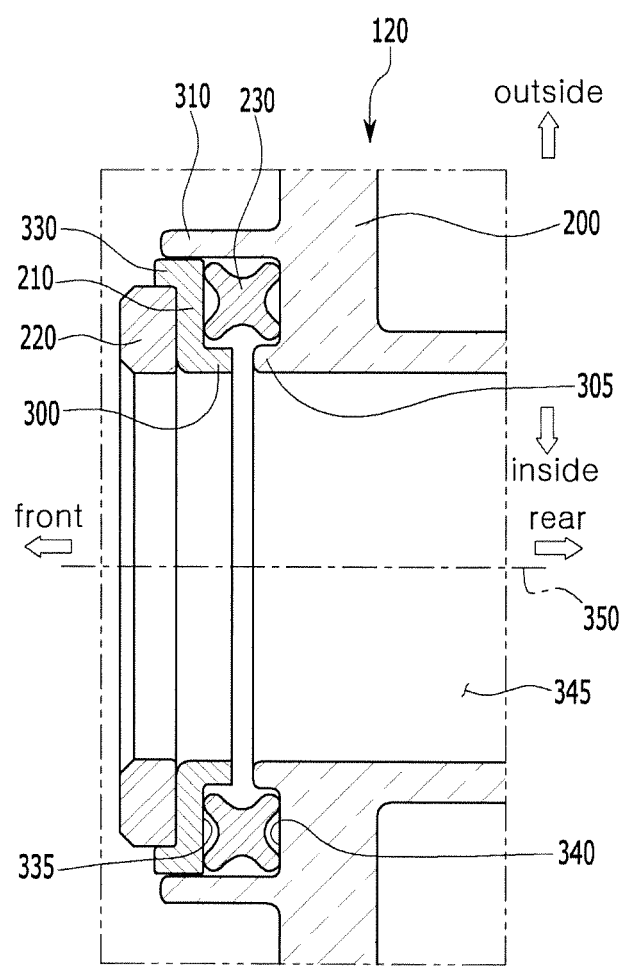
FIG. 3 is a partial cross-sectional view showing the coolant control valve unit according to the embodiment of the present invention.

FIG. 3 is a partial cross-sectional view showing the coolant control valve unit according to the embodiment of the present invention.

Referring to FIG. 3, the fitting coolant passage 345 is formed along a center axis 350 of the fitting 200, a fitting inner protrusion 305 is formed along an inner circumference of the front surface 340 of the fitting 200 at a position close to the center axis 350, and a fitting outer protrusion 310 is formed by extending forward on the front surface 340 of the fitting 200 at a position outside the fitting inner protrusion 305.

The rubber ring 230 is provided between the fitting inner protrusion 305 and the fitting outer protrusion 310. Further, the support ring 210 is provided on a front surface of the rubber ring 230.

The support ring 210 is provided with a support ring inner protrusion 300 formed along an inner circumference of a rear surface of the support ring 210, and is provided with a support ring outer protrusion 330 formed along an outer circumference of a front surface of the support ring 210. Here, the support ring inner protrusion 300 and the fitting inner protrusion 305 are formed at positions corresponding to each other, such that a predetermined gap is formed therebetween.

The sealing ring 220 is provided on the front surface of the support ring 210. Here, the sealing ring 220 comprises a Teflon material, and the sealing ring 220 and the rotary valve 100 have a slidable relationship therebetween.

The support ring outer protrusion 330 of the support ring 210 serves to prevent the sealing ring 220 from being separated. Further, the support ring inner protrusion 300 of the support ring 210, the fitting inner protrusion 305, and the fitting outer protrusion 310 serve to efficiently prevent the rubber ring 230 from being separated.

In addition, the gap defined between the support ring inner protrusion 300 and the fitting inner protrusion 305 allows the rubber ring 230 to be stretched and compressed therebetween.

In the embodiment of the present invention, the rubber ring 230 is made of a rubber material, which may comprise an (Ethylene Propylene Diene Monomer: EPDM) material, the support ring 210 may comprise a (Poly Phenylene Sulfide: PPS) material, the sealing ring 220 may comprise a (Polytetrafluoroethylene: PTFE) material, and the fitting 200 may comprise a (Plastic: PL) material, and the support ring 210 and the sealing ring 220 may comprise a Teflon material.

Figure 4:
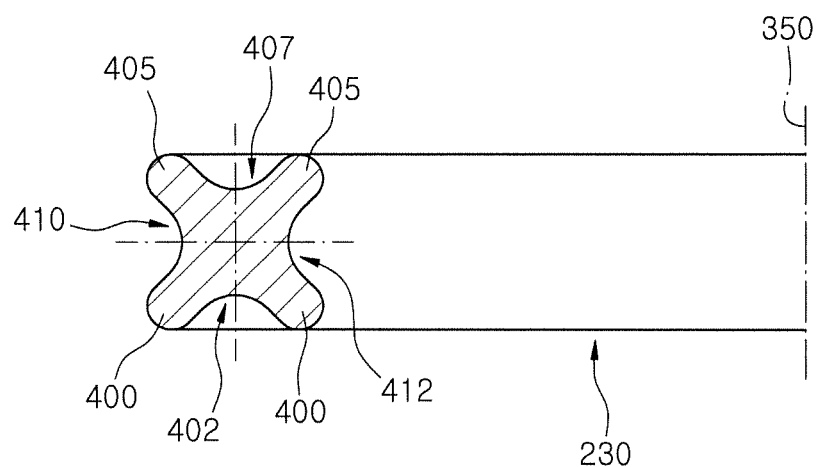
FIG. 4 is a side cross-sectional view showing a rubber ring of the coolant control valve unit according to the embodiment of the present invention.

FIG. 4 is a side cross-sectional view showing the rubber ring of the coolant control valve unit according to an embodiment of the present invention.

Referring to FIG. 4, the rubber ring 230 is formed in a ring shape, and is provided at a circumference of the fitting coolant passage 345, and has an X-shaped cross section in a width direction.

More specifically, in the cross section of the rubber ring 230, the rubber ring 230 is provided with a front groove 407 being formed along a center of a front surface of the rubber ring 230, at a rear groove 402 being formed along a center of a rear surface of the rubber ring 230, an inner groove 412 being formed along an inner surface of the rubber ring 230, and an outer groove 410 being formed along an outer surface of the rubber ring 230.

The rubber ring 230 has the X-shaped cross section through the front groove 407, the rear groove 402, the inner groove 412, and the outer groove 410.

In addition, due to the above structure of the grooves, the rubber ring 230 has a protrusion structure comprising front protrusions 405 and rear protrusions 400 that extend in four directions.

Figure 5:
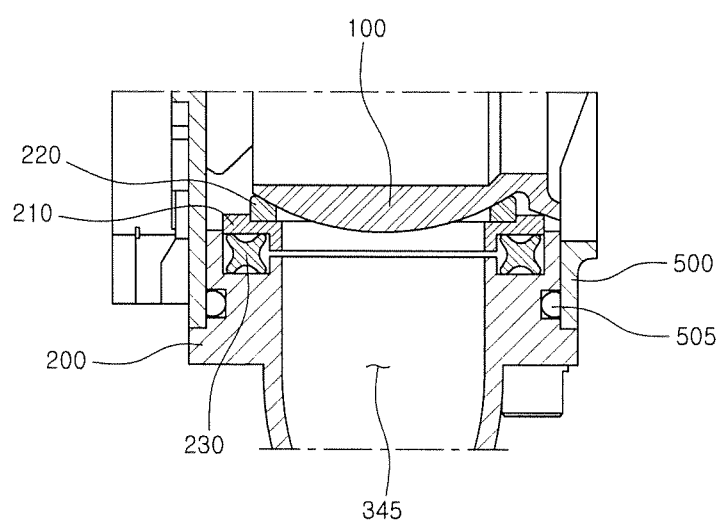
FIG. 5 is a partial cross-sectional view showing the coolant control valve unit according to the embodiment of the present invention.

FIG. 5 is a partial cross-sectional view showing the coolant control valve unit according to the embodiment of the present invention.

Referring to FIG. 5, the front protrusion 405 of the rubber ring 230 is in contact with the rear surface 335 of the support ring 210, and the rear protrusion 400 is in contact with the front surface 340 of the fitting 200, such that a sealing structure is provided on both the front surface 340 of the fitting 200 and the rear surface 335 of the support ring 210.

In the embodiment of the present invention, the fitting 200 is inserted into the valve housing 500, and is fixed by a fixing means. The fitting 200 is provided with a fitting chamber 505, such that a sealing structure between the outer circumferential surface of the fitting 200 and the valve housing 500 is implemented.

In addition, the outer circumferential surface of the rotary valve 100 is a ball-shaped curved surface, and the sealing ring 220 has an inclined surface corresponding to the ball-shaped curved surface.

Figure 6:
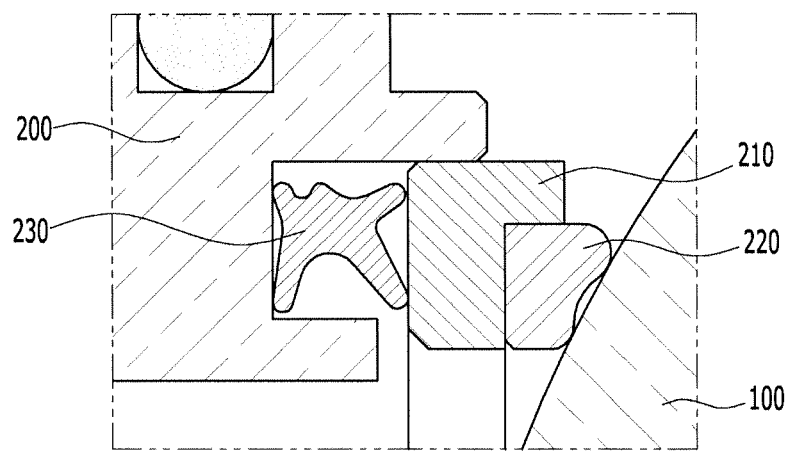
FIG. 6 is a partial cross-sectional view showing a coolant control valve unit according to an embodiment of the present invention.

FIG. 6 is a partial cross-sectional view showing a coolant control valve unit according to an embodiment of the present invention.

Referring to FIG. 6, the coolant control valve unit includes a fitting 200, a rubber ring 230, a support ring 210, a sealing ring 220, and a rotary valve 100. In comparison with FIGS. 1 to 5, only characteristic differences are described in FIG. 6. Here, the rubber ring 230 has substantially a K-shape.

Figure 7:
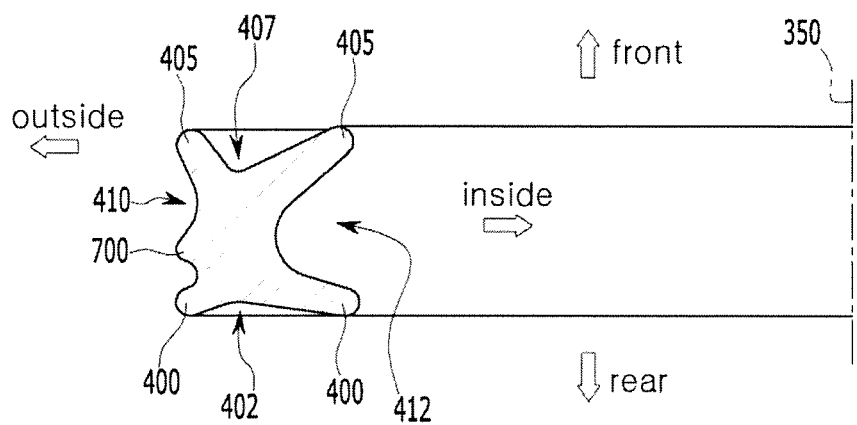
FIG. 7 is a side cross-sectional view showing a rubber ring of the coolant control valve unit according to the embodiment of the present invention.

FIG. 7 is a side cross-sectional view showing the rubber ring of the coolant control valve unit according to the embodiment of the present invention.

Referring to FIG. 7, the rubber ring 230 includes the front groove 407, the rear groove 402, the inner groove 412, and the outer groove 410, wherein the rubber ring 230 is further provided with an auxiliary protrusion 700 formed in the outer groove 410 by protruding outward.

Due to the above structure of the grooves, two front protrusions 405 and two rear protrusions 400 are formed, and the auxiliary protrusion 700 is further formed in the outer groove 410. Here, the auxiliary protrusion 700 serves to enhance the overall structure of the rubber ring 230 and to improve the sealing performance by additionally forming a contact sealing point.

For reference, the numerals 350 in FIGS. 3, 4 and 7 indicate an axis of the rubber ring 230.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A coolant control valve unit having a sealing structure, the control valve unit comprising:
   a rotary valve having a valve coolant passage from an inner circumferential surface to an outer circumferential surface of the rotary valve;
   a valve housing in which the rotary valve is rotatably disposed;
   a fitting coupled to the valve housing at, a position corresponding to the valve coolant passage, and having a fitting coolant passage corresponding to the valve coolant passage; and
   a sealing unit disposed between a front surface of the fitting and the outer circumferential surface of the rotary valve,
   wherein the sealing unit includes:
      a sealing ring being in contact with the outer circumferential surface of the rotary valve to realize a slidable relationship therebetween;
      a rubber ring disposed on the front surface of the fitting, and bringing the sealing ring into close and elastic contact with the outer circumferential surface of the rotary valve; and
      a support ring disposed between a rear surface of the sealing ring and the rubber ring, wherein the rubber ring has an X-shaped cross-section and comprises:
         a front groove grooved along a center of a front surface of the rubber ring;
         a rear groove grooved along a center of a rear surface of the rubber ring;
         an inner groove grooved along an, inner surface of the rubber ring to be directed toward a center of the fitting coolant passage; and
         an outer groove grooved oppositely to the inner groove,
   wherein the support ring includes:
      a support ring outer protrusion protruding on an outer circumference of a front surface of the support ring; and
      a support ring inner protrusion protruding on an inner circumference of a rear surface of the support ring,
   wherein the fitting has a fitting inner protrusion circumferentially protruding on the front surface of the fitting at a position close to the center of the fitting coolant passage to correspond to the support ring inner protrusion, wherein the support ring inner protrusion and the fitting inner protrusion are spaced apart from each other by a predetermined gap in which the rubber ring is disposed to be stretched and compressed in a space between the fitting and the support ring, wherein the fitting has a fitting outer protrusion circumferentially protruding on the front surface of the fitting at a position outside the fitting inner protrusion, with the rubber ring being disposed therebetween, wherein the fitting outer protrusion extends forward such that an inner circumferential surface of the fitting outer protrusion faces at least a part of an outer circumferential surface of the support ring outer protrusion, and wherein an inner diameter of the sealing ring corresponds to an inner diameter of the fitting and an inner diameter of the support ring such that a coolant passing through the fitting coolant passage passes a passage formed by the inner diameter of the sealing ring.

2. The control valve unit of claim 1, wherein the rubber ring comprises:
front protrusions between the front groove and the outer groove and between the front groove and the inner groove, respectively; and
rear protrusions between the rear groove and the outer groove and between the rear groove and the inner groove, respectively,
wherein the front protrusions and the rear protrusions extend in four directions by predetermined distances to have the X-shaped cross-section.

3. The control valve unit of claim 1, wherein each of the sealing ring and the rubber ring has a ring shape corresponding to a shape of the valve coolant passage.

4. The control valve unit of claim 3, wherein the outer circumferential surface of the rotary valve is a ball-shaped curved surface, and the valve coolant passage passes through the ball-shaped curved surface.

5. The control valve unit of claim 2, wherein the rubber ring further includes an auxiliary protrusion in the outer groove by protruding outward.

6. The control valve unit of claim 4, wherein the outer circumferential surface of the rotary valve is a ball-shaped curved surface, and the sealing ring has an inclined surface corresponding to the ball-shaped curved surface.

7. A sealing unit, comprising:
a sealing ring;
a support ring disposed on a rear surface of the sealing ring;
a rubber ring disposed on a rear surface of the support ring; and
a fitting which is in contact with the support ring and the rubber ring, wherein the fitting is coupled to a valve housing of a coolant control valve unit to connect the sealing unit to the coolant control valve unit,
wherein the rubber ring has an X-shaped cross section and comprises:
a front groove grooved at a center of a front surface of the rubber ring;
a rear groove grooved at a center of a rear surface of the rubber ring;
an inner groove grooved along an inner surface of the rubber ring; and
an outer groove grooved oppositely to the inner groove,
wherein the support ring, which is disposed between the rear surface of the sealing ring and the rubber ring, includes:
a support ring outer protrusion protruding on an outer circumference of a front surface of the support ring; and
a support ring inner protrusion protruding on an inner circumference of the rear surface of the support ring,
wherein the fitting includes:
a fitting coolant passage passing through a center of the fitting;
a fitting inner protrusion circumferentially protruding from a front surface of the fitting to correspond to the support ring inner protrusion, wherein the support ring inner protrusion and the fitting inner protrusion are spaced apart from each other by a predetermined gap in which the rubber ring is disposed to be stretched and compressed in a space between the fitting and the support ring; and
a fitting outer protrusion circumferentially protruding from the front surface of the fitting at a position outside the fitting inner protrusion, with the rubber ring being disposed therebetween,
wherein the fitting outer protrusion extends forward such that an inner circumferential surface of the fitting outer protrusion faces at least a part of an outer circumferential surface of the support ring outer protrusion, and
wherein an inner diameter of the sealing ring corresponds to an inner diameter of the fitting and an inner diameter of the support ring such that a coolant passing through the fitting coolant passage passes a passage formed by the inner diameter of the sealing ring.

8. The sealing unit of claim 7, wherein the rubber ring further includes an auxiliary protrusion formed in the outer groove by protruding outward.

* * * * *

UNITED STATES PATENT AND TRADEMARK OFFICE
CERTIFICATE OF CORRECTION

PATENT NO. : 10,352,460 B2
APPLICATION NO. : 15/583203
DATED : July 16, 2019
INVENTOR(S) : Jae Soo Jang Page 1 of 1

It is certified that error appears in the above-identified patent and that said Letters Patent is hereby corrected as shown below:

On the Title Page

(73) Assignees:
"HYUNDAI MOTOR COMPANY, Seoul (KR);
KIA MOTORS CORPORATION, Seoul (KR);
MVH KOREA, INC., Ulsan (KR);
INZICONTROLS CO., LTD., Siheung-si, Gyeonggi-do (KR);
GMB KOREA CORP., Changwon-si, Gyeongsangnam-do (KR)"

Should read:
--HYUNDAI MOTOR COMPANY, Seoul (KR);
KIA MOTORS CORPORATION, Seoul (KR);
NVH KOREA, INC., Ulsan (KR);
INZICONTROLS CO., LTD., Siheung-si, Gyeonggi-do (KR);
GMB KOREA CORP., Changwon-si, Gyeongsangnam-do (KR)--

Signed and Sealed this
Seventeenth Day of September, 2019

Andrei Iancu
*Director of the United States Patent and Trademark Office*